(12) United States Patent
Meyer

(10) Patent No.: US 11,877,220 B2
(45) Date of Patent: Jan. 16, 2024

(54) SYSTEM AND METHOD FOR WIRELESS POWER TRANSFER AND COMMUNICATION

(71) Applicant: Shure Acquisition Holdings, Inc., Niles, IL (US)

(72) Inventor: Christopher Meyer, Libertyville, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/309,230

(22) Filed: Apr. 28, 2023

(65) Prior Publication Data

US 2023/0353999 A1 Nov. 2, 2023

Related U.S. Application Data

(63) Continuation of application No. 17/303,450, filed on May 28, 2021, now Pat. No. 11,678,165.
(Continued)

(51) Int. Cl.
*H02J 50/90* (2016.01)
*H04W 4/80* (2018.01)
(Continued)

(52) U.S. Cl.
CPC ............... *H04W 4/80* (2018.02); *G08B 5/00* (2013.01); *G08B 21/182* (2013.01); *H02J 50/90* (2016.02)

(58) Field of Classification Search
CPC .......... H02J 50/00; H02J 50/005; H02J 50/10; H02J 50/40; H02J 50/402; H02J 50/90; H01F 38/14; H04B 5/0037; H04B 5/0043
See application file for complete search history.

(56) References Cited

U.S. PATENT DOCUMENTS 11,223,230 B2 1/2022 Sauterel
2014/0015493 A1 1/2014 Wirz
(Continued)

FOREIGN PATENT DOCUMENTS

CN 204681130 9/2015
WO 2016005984 1/2016
WO WO-2016005984 A1 * 1/2016 ................ H02J 5/00

OTHER PUBLICATIONS

International Search Report and Written Opinion for PCT/US2021/070639 dated Oct. 28, 2021, 17 pp.

*Primary Examiner* — Benyam Haile
(74) *Attorney, Agent, or Firm* — Neal, Gerber & Eisenberg LLP

(57) ABSTRACT

A wireless power transfer system is provided, comprising a first device having a power supply and configured to wirelessly transmit electric power from the power supply, and a second device having one or more electrical components and configured to wirelessly receive the electric power and provide it to the one or more electrical components for consumption. The second device further comprises an alignment module configured to activate an indicator if a measured level of the received power is greater than a threshold level. Also provided is a wireless system comprising a first device having a power supply and a wireless transmitter configured to transmit a data signal and an electric power signal, and a second device having a wireless receiver configured to receive the electric power signal and data signal, and one or more electrical components configured to consume the received power and process the received data.

20 Claims, 5 Drawing Sheets

Related U.S. Application Data

(60) Provisional application No. 63/032,351, filed on May 29, 2020.

(51) Int. Cl.
  *G08B 5/00*   (2006.01)
  *G08B 21/18*   (2006.01)

(56) References Cited

U.S. PATENT DOCUMENTS

| | | |
|---|---|---|
| 2018/0287413 A1 | 10/2018 | Jung |
| 2020/0083754 A1 | 3/2020 | Tian |
| 2020/0259369 A1 | 8/2020 | Stingu |
| 2021/0211760 A1 | 7/2021 | Kim |

\* cited by examiner

Example 1: Received Power Level = 100%
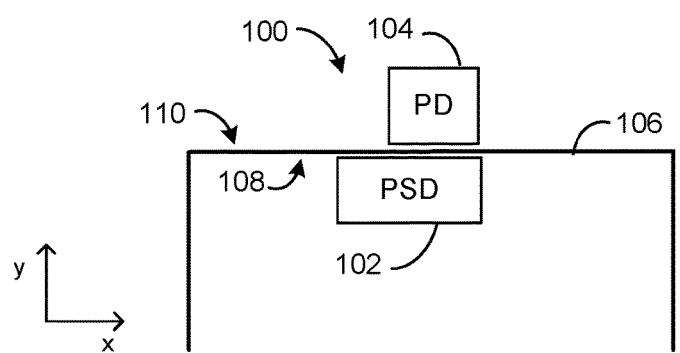
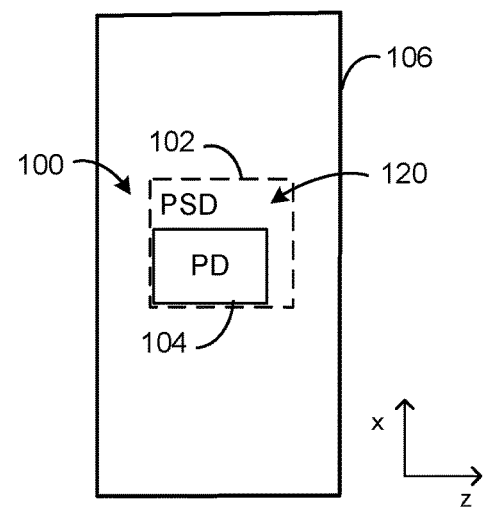
FIG. 2A
FIG. 2B
Example 2: Received Power Level = 90%
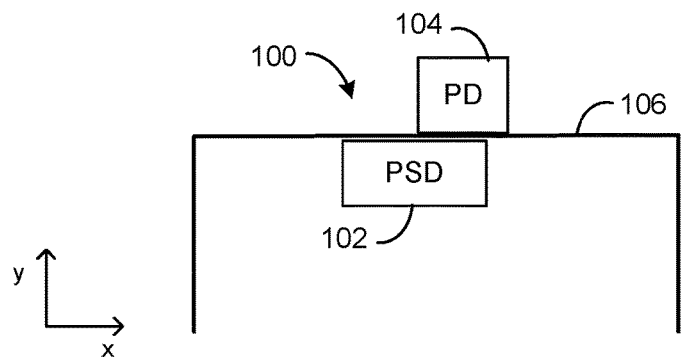
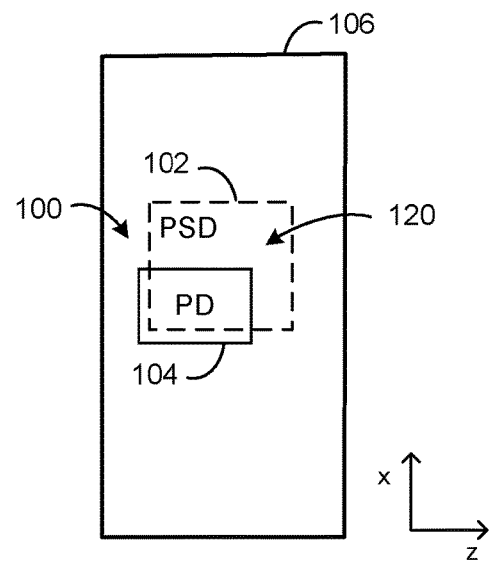
FIG. 3A
FIG. 3B

Example 3: Received Power Level = 50%
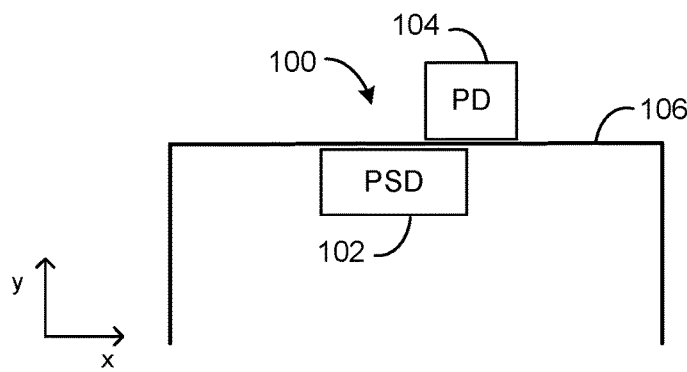
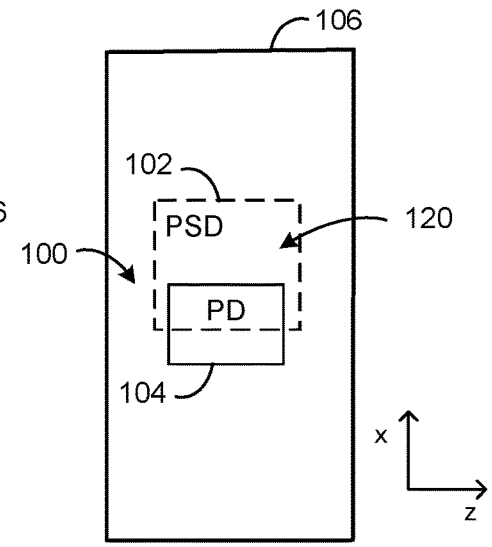
FIG. 4A
FIG. 4B
Example 4: Received Power Level = 0%
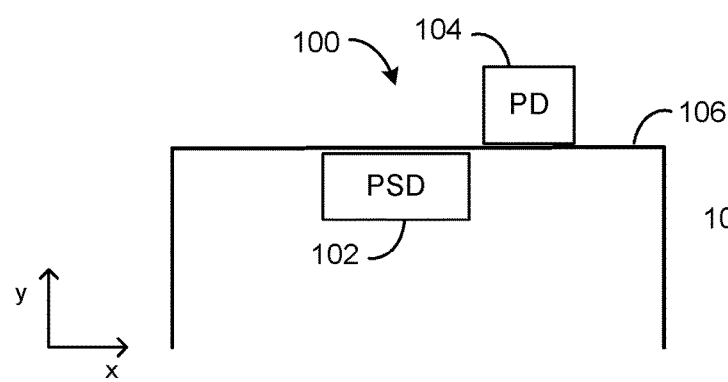
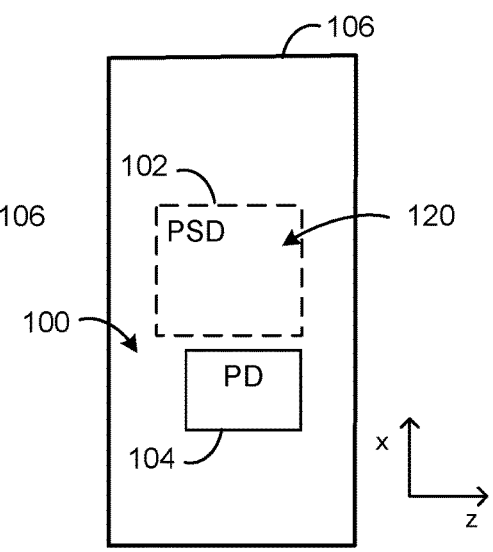
FIG. 5A
FIG. 5B

SYSTEM AND METHOD FOR WIRELESS POWER TRANSFER AND COMMUNICATION

CROSS-REFERENCE

This application is a continuation of U.S. Non-provisional patent application Ser. No. 17/303,450, filed on May 28, 2021, which claims priority to U.S. Provisional Patent Application No. 63/032,351, filed on May 29, 2020, the contents of both which are incorporated herein by reference in their entireties.

TECHNICAL FIELD

This application generally relates to wireless power transfer. In particular, this application relates to a system and method for wirelessly transferring electric power and communication signals from a power supplying device to a power consuming device.

BACKGROUND

Recently, there has been a rise in the use of wireless power transfer techniques to supply electrical power to various electronic devices, such as mobile phones, smartphones, tablets, laptops, and household appliances (e.g., electric toothbrushes, coffeemakers, induction cooking devices, etc.), instead of the traditional method of supplying electrical energy over a wired connection. Wireless power transfer may be useful for powering electrical devices where interconnecting wires are inconvenient, messy, hazardous, or simply, not possible.

Typical wireless power transfer systems include a power transmitting device that draws electric power from a power source, such as a wall outlet, and a power receiving device that supplies the received power to an electrical load, such as a battery. There are various different types of existing wireless power transfer techniques. Some are near field, non-radiative techniques that are capable of transferring power over shorter distances (e.g., within about one wavelength), using magnetic fields resulting from inductive coupling between coils of wire, or using electric fields resulting from capacitive coupling between metal electrodes. Other wireless power techniques are far field, radiative methods that are capable of transferring power over longer distances (e.g., over one wavelength) using directed electromagnetic beams (e.g., microwaves, radio waves, or lasers) or other radio frequency (RF) energy transfer protocol.

In many conference rooms, microphones, control devices, and other conferencing devices may be placed on one or more tabletop surfaces to structurally support the devices and boost their mechanical robustness. For both convenience and aesthetic reasons, most users and installers prefer to keep the tabletop looking neat and clutter free, for example, by hiding any power, audio, and/or data cables connected to the conferencing devices in the area beneath the table, where the cables may be coupled to respective outlets on the floor or a nearby wall, or to other conferencing devices. Current methods for installation of such devices on a tabletop require taking the conference room offline, locating appropriate mounting locations on the respective table surface(s), and drilling significantly sized holes (often, one inch in diameter or larger) through the table to allow for cable passage. However, many of the tables in high-end board rooms or other conferencing spaces are rather large and made of exotic materials, which makes them quite costly. As a result, the owners of such tables are typically reluctant to drill holes into them, especially when there is a chance that the hole may need to be moved or re-sized once the conferencing system is updated with new equipment (which typically occurs every three to five years), or if the installer makes a mistake while cutting the table.

Accordingly, there is an opportunity for conferencing systems that address these concerns. More particularly, there is an opportunity for an electronic device capable of operating as part of the conferencing system and being installed on a given surface without permanently modifying the installation site.

SUMMARY

The invention is intended to solve the above-noted problems by providing a wireless power transfer system having, among other things, (1) a power supplying device configured to wirelessly transmit a data signal and electric power from a power source, (2) a powered device configured to wirelessly receive the power and the data signal and provide the received power to one or more electronic components for consumption, and (3) a contactless configuration that places the power supplying device and the powered device on opposite sides of a given surface.

One exemplary embodiment provides a wireless power transfer system comprising a first device and a second device. The first device comprises a power supply and is configured to wirelessly transmit electric power from the power supply. The second device comprises one or more electrical components and is configured to wirelessly receive the electric power transmitted by the first device and provide the received power to the one or more electrical components for consumption. The second device further comprises an alignment module configured to activate an indicator if a measured level of the received power is greater than a threshold level.

Another exemplary embodiment provides a wireless system comprising a first device and a second device. The first device comprises a power supply and a wireless transmitter configured to transmit a data signal and an electric power signal. The second device comprises a wireless receiver configured to receive the electric power signal and the data signal from the first device, and one or more electrical components configured to consume the received electric power signal and process the data signal.

Yet another exemplary embodiment provides a method of indicating a received power level in a wireless power transfer system having a processor communicatively coupled to a power sensor and an indicator, the method comprising determining, using the power sensor, a power level of the wireless electric power signal; comparing, using the processor, the determined power level to a threshold level; and upon determining that the power level exceeds the threshold level, activating the indicator.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIGS. 2A through 5B are block diagrams depicting exemplary configurations of the wireless power transfer system in the environment shown in FIG. 1, in accordance with certain embodiments.

DETAILED DESCRIPTION

Figure 1:
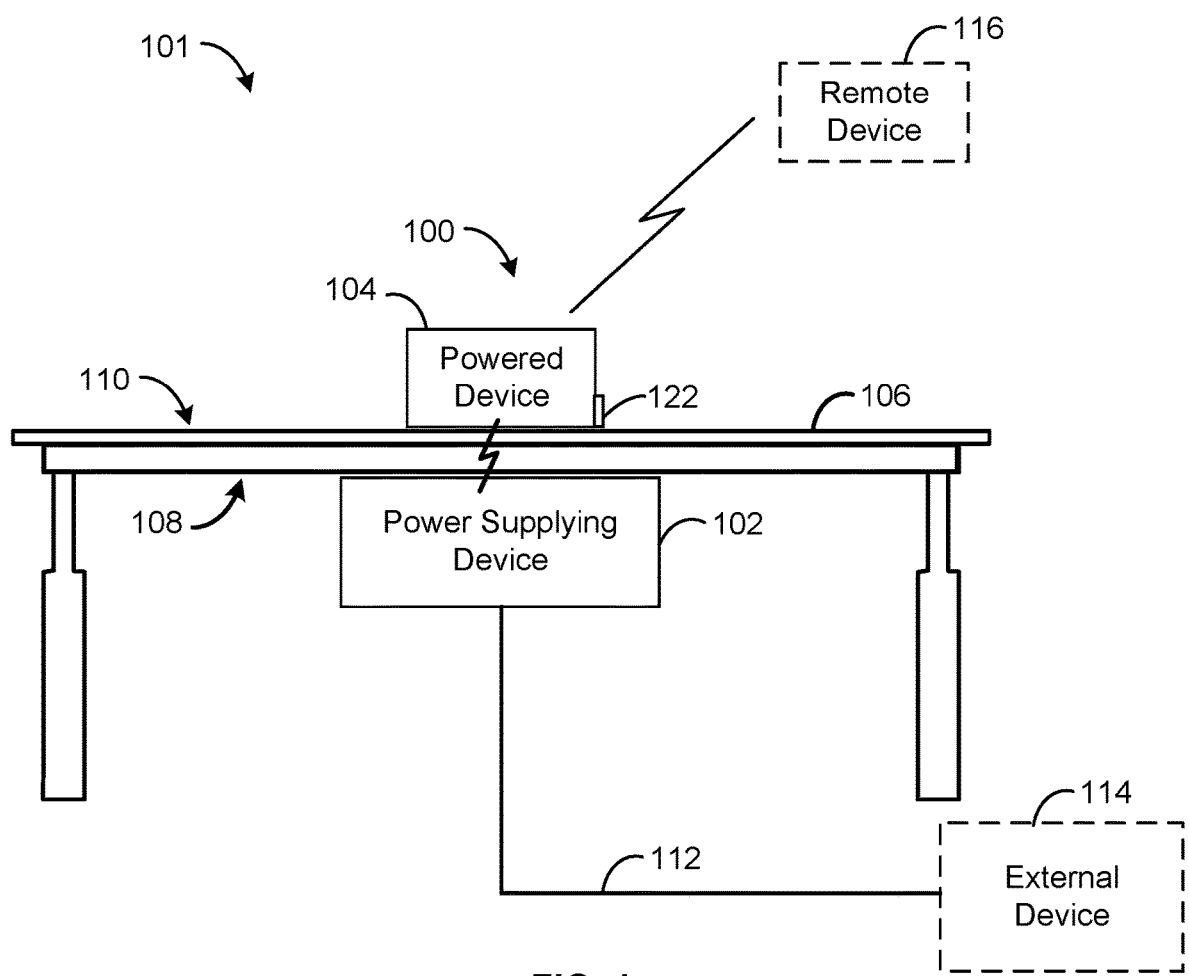
FIG. 1 is a schematic diagram depicting an exemplary wireless power transfer system disposed in an exemplary conferencing environment, in accordance with certain embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

Systems and methods are provided herein for a wireless power transfer system comprising a power supplying device configured to wirelessly, and contactlessly, transmit power, as well as data, to a powered device, thus enabling the wireless system to be installed in a conferencing environment (e.g., boardroom) without permanently cutting, drilling, otherwise altering a table or other surface in the environment. The powered device may be placed on a top, or user-facing side, of the table, the power supplying device may be attached to a bottom, or underside, of the table, adjacent the location of the powered device, and all signals, including power and communications, may be transported wirelessly through the table and between the two devices. As a result, the wireless system may be installed in, or removed from, any meeting space with little disruption or modification to the area. To help ensure proper installation, the powered device includes a user-facing indicator for indicating whether a current position of the powered device is sufficiently aligned with the power supplying device located underneath the table (and therefore, out of sight), as the relative alignment of the powered device and the power supplying device can affect the power coupling quality of the wireless system. At the powered device, the received power is consumed directly by one or more electrical components included in the powered device, rather than charging a battery or other power source.

FIG. 1 illustrates an exemplary wireless power transfer system 100 installed in an exemplary environment 101, in accordance with embodiments. The environment 101 may be a board room, a conference room, an office, a temporary meeting space, or any other conferencing environment designed to facilitate a meeting between multiple individuals, whether physically present or remotely located. The environment 101 may include one or more surfaces (e.g., a boardroom table, countertop, shelf, cabinet, etc.) for supporting one or more conferencing devices (e.g., microphones, speakers, mute buttons, display screens, etc.), including the wireless power transfer system 100, as shown. The conferencing device(s) may be in communication with each other or a master device to transport various signals, such as audio signals, data signals, and/or power signals, using wired or wireless connections.

The wireless power transfer system 100 (also referred to herein as a "wireless system") comprises a power supplying device 102 configured to wirelessly transmit electric power obtained from a power supply included in the device 102 and a powered device 104 configured to wirelessly receive the electric power transmitted by the power supplying device 102. The power supplying device 102 can be configured to supply power to any compatible power-seeking device, such as the powered device 104, placed within a predetermined range of a wireless transmitter included in the power supplying device 102. The powered device 104 can be configured to provide the received power to one or more electrical components that are included in the device 104 and are configured to consume the received power. In some embodiments, the powered device 104 does not include a battery or charge management technology, as is conventional for existing wirelessly powered devices, because the received power is not used to charge a battery or other power source of the powered device 104. Rather, the received power is provided directly to its one or more electrical components for consumption. In other embodiments, the powered device 104 may include a battery or other power source and may be configured to charge said power source using the power wirelessly received from the power supplying device 102.

The powered device 104 may be any type of conferencing device or other electronic device present in the conferencing environment 101 and capable of wirelessly receiving electric power from the power supplying device 102. For example, the powered device 104 may be a microphone or other audio detecting device, a speaker or other audio listening device, or a mute button, control button, phone dialer or other user input device for controlling one or more features of the conferencing environment 101. As another example, the powered device 104 may be a personal electronic device of a conference participant, such as, e.g., a smartphone or other mobile phone, a tablet, laptop, or other computer, etc.

In some embodiments, the power supplying device 102 can be further configured to wirelessly transmit a data signal to the powered device 104, and the powered device 104 can be further configured to wirelessly receive the data signal and process the received data signal using the one or more electrical components. As an example, the data signal may include control information, received at the power supplying device 102 from another conferencing device, for controlling, or adjusting one or more parameters of, the electrical component(s) in the powered device 104. The control information may include, for example, user inputs for controlling a volume level, power (e.g., on or off), or a mute function (e.g., on or off). In some cases, the power supplying device 102 may be configured to wirelessly transport power signals to the powered device 104 while also wirelessly transmitting data signals to the same device 104 (e.g., simultaneously).

In some embodiments, the power supplying device 102 may be further configured to wirelessly transmit an audio signal to the powered device 104, along with or instead of the data signal. As an example, the audio signal may be received at the power supplying device 102 from another conferencing device. The audio signals may be digital or analog and may include live or real-time audio (e.g., voices) spoken by human speakers (or other participants of a given meeting), pre-recorded audio files reproduced by an audio player, streaming audio received from a remote audio source using a network connection, other types of user content, or other sounds associated with the meeting. In some embodiments, the power supplying device 102 may be configured to transmit audio-visual data to the powered device 104, along with the power signal.

In some embodiments, the power supplying device 102 may be configured to wirelessly receive data and/or audio signals from the powered device 104, in addition to or instead of transmitting data and/or audio signals to the powered device 104. In such cases, the audio signals may be generated by the powered device 104 or received at the device 104 from another conferencing device, and the data signals may include, for example, control inputs or commands received at the powered device 104 from a user. In some embodiments, the audio and/or data signals include audio-visual data representing user content generated in association with the conferencing environment 101, pre-recorded user content, or streaming content. In some embodiments, the data signals may include control information for controlling one or more other components in the environment.

Figure 6:
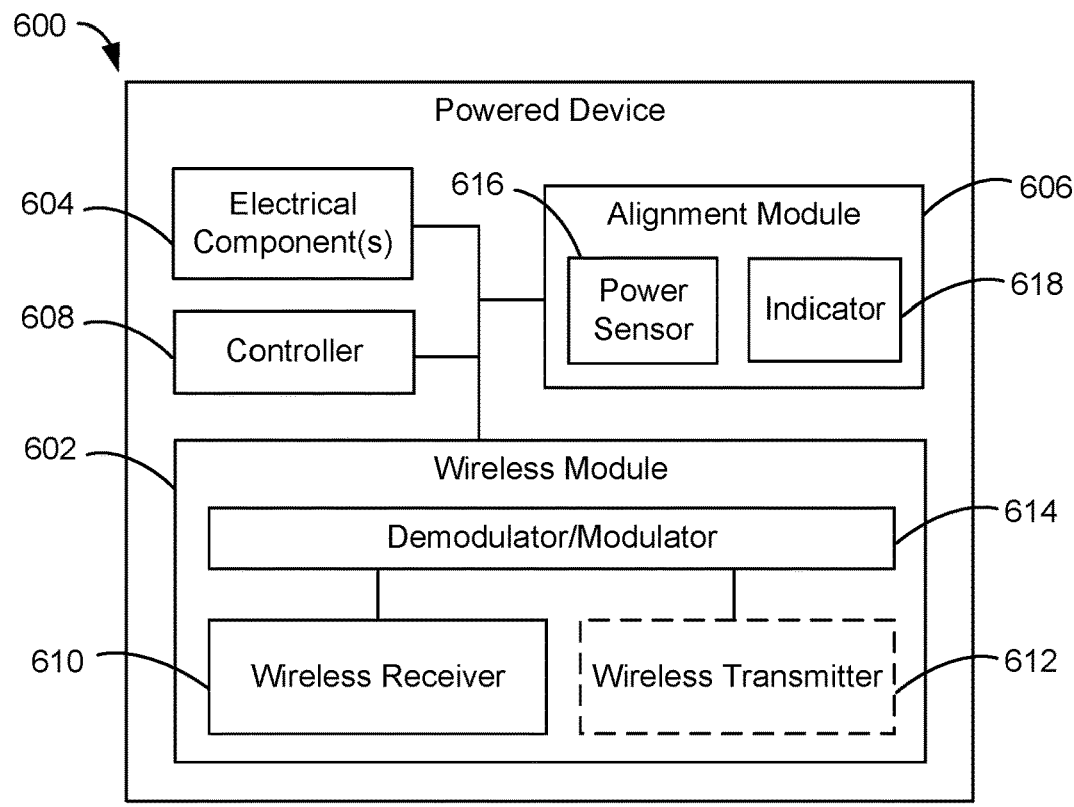
FIG. 6 is a block diagram depicting an exemplary powered device included in the wireless power transfer system of FIG. 1, in accordance with certain embodiments.
Figure 8:
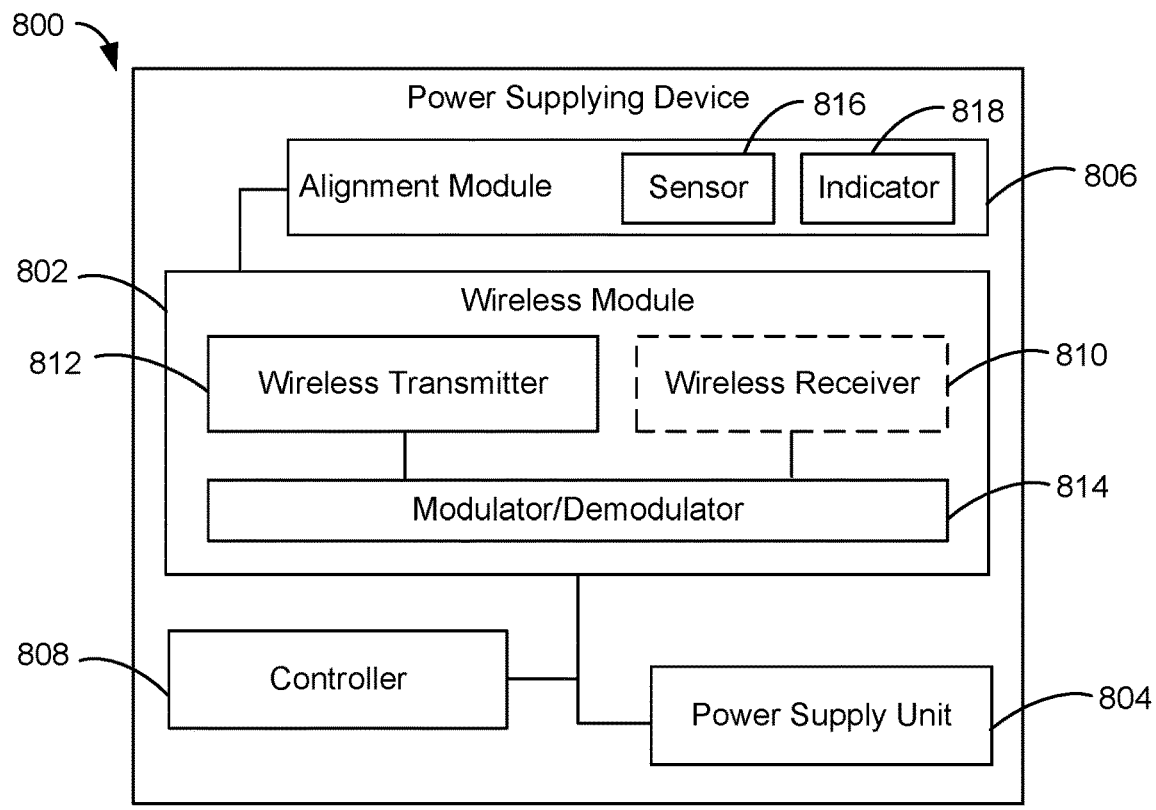
FIG. 8 is a block diagram depicting an exemplary power supplying device included in the wireless power transfer system of FIG. 1, in accordance with certain embodiments.

According to embodiments, the powered device 104 (also referred to herein as a "second device") may be substantially similar to the powered device 600 shown in FIG. 6, and the power supplying device 102 (also referred to herein as a "first device") may be substantially similar to the power supplying device 800 shown in FIG. 8. Accordingly, further details about the individual components of the devices 102 and 104, and their respective operation, are provided below with reference to FIGS. 6 and 8, for the sake of brevity.

The power supplying device 102 may be a wireless power transfer pad, mat, plate, or box, or have any other type of housing configured to encase the power supply, wireless circuitry, and other components of the device 102. The housing of the power supplying deice 102 may be further configured for attachment to a surface 106 located in the conferencing environment 101.

During installation of the wireless system 100, the power supplying device 102 and the powered device 104 may be coupled to opposite sides of the surface 106, without cutting or drilling into the surface 106, or otherwise permanently altering the surface 106, thus enabling contactless wireless power delivery. In other embodiments, the powered device 104 may be in contact with the power supplying device 102 during wireless power transfer.

In the illustrated embodiment, the surface 106 is a table having a substantially planar tabletop (e.g., a boardroom table or other table for conducting meetings). In other embodiments, the surface 106 may be any other substantially planar surface that a user does not wish to drill through or otherwise permanently alter during installation of the wireless system 100. Examples include, but are not limited to, a countertop, shelf, or other horizontal surface; a wall, panel, or other vertical surface (e.g., a glass wall, drywall, a cubicle wall, a room divider, etc.); and cabinet surfaces (e.g., a cabinet door, side wall, shelf, etc.).

As shown in FIG. 1, the power supplying device 102 may be configured for attachment to a first side 108 of the surface 106 that is normally concealed from view during use of the conferencing environment 101, such as, e.g., a back side or underside of the table shown in FIG. 1. Conversely, the powered device 104 may be configured for placement on a second side 110 of the surface 106 that is disposed opposite the first side 108 and normally faces a user of the powered device 104, or is otherwise exposed or visible during use of the environment 101, such as, e.g., a top or front side of the table shown in FIG. 1. In embodiments, the power supplying device 102 may be coupled to the first side 108 of the surface 106 using one or more removable, repositionable, or semi-permanent attachment mechanisms, such as, for example, a non-marring adhesive, hook and loop, shallow screws, or other mechanical mechanisms, magnets or other non-mechanical mechanisms, or any combination thereof. In embodiments, the powered device 104 may be coupled to the second side 110 of the surface 106 using one or more removable, repositionable, or semi-permanent attachment mechanisms, including, for example, non-marring adhesive, hook and loop, friction-based, or other mechanical mechanisms, magnets or other non-mechanical mechanisms, or any combination thereof.

In some embodiments, the wireless system 100 further comprises one or more cables 112 for electrically coupling the power supplying device 102 to an external electronic device 114 (also referred to herein as an "external device") included in the environment 101, and transporting one or more of power, audio, and data signals to and/or from the power supplying device 102. As shown in FIG. 1, because the power supplying device 102 is coupled to the underside 108 of the table 106, any cable(s) 112 coupled thereto also extend underneath the table or surface 106, thus hiding both from the user's view during normal use of the conferencing environment 101. Likewise, the external device 114 may also be disposed underneath the table 106 or otherwise out of sight within the environment 101. Such configuration leaves only the powered device 104 on the user-facing side 110 of the conferencing table 106, thereby reducing the amount of clutter (e.g., wires, cables, devices, etc.) on the tabletop. Accordingly, the wireless power transfer features of the wireless system 100 can not only prevent permanent modification of the table 106 or other surface but also, may provide users with a neat, substantially cable-free conferencing space.

In some embodiments, the one or more cables 112 may include a power cable, an audio cable, a data cable, an Ethernet cable, a Universal Serial Bus (USB) cable, a coaxial cable or other bundle of multiple wires for respectively transporting different types of signals (e.g., power, data, audio), a proprietary cable, or any other wire or cable capable of communicatively coupling the power supplying device 102 to the external device 114. At least one of the external device 114 and the power supplying device 102 may include an electrical outlet, Ethernet port, USB port, or other connector configured to electrically connect to at least one end of the cable 112.

In some embodiments, the external device 114 comprises an external power source configured to deliver electric power to the power supplying device 102, via the cable 112, and the power supplying device 102 can be configured to wirelessly transmit the received power to the powered device 104. In such cases, the external power source may be an electrical outlet (e.g., an AC power socket) embedded into a wall or floor of the conferencing environment 101, an external battery, an electric power generator, or any other device capable of supplying electric power to the power supplying device 102 via the cable 112.

In other embodiments, the external device 114 may be a conferencing device that is configured to transmit one or more of power, audio (or audio-visual), and data signals to the power supplying device 102 over the cable 112. In some embodiments, the external device 114 is further configured to receive one or more of audio and data signals from the power supplying device 102 over the cable 112. For example, the external device 114 may be a conferencing system processor that is part of a networked system included in the conferencing environment 101 to handle one or more operations, such as, e.g., network connections (wireless and/or wired), audio processing and/or digital signal processing, audio playback, video display, etc. As another example, the external device 114 may be, or include, one or more of a speaker, a microphone, or other audio device used in the conferencing environment 101. In some cases, the external conferencing device 114 may include processing hardware for handling the audio and data signals, as well as a power source (e.g., battery) or other power supply (e.g., electrical outlet connection) for providing electrical power to the power supplying device 102 over the cable 112.

In other embodiments, the power supplying device 102 may include a battery or other internal power source that is integrated into the device 102 and configured to supply the electric power that is wirelessly transmitted to the powered device 104. In such cases, the wireless system 100 may not include one or more of the external device 114 and the cable 112. In other cases, the wireless system 100 may still include the cable 112 for transporting at least one of data signals and audio signals between the external device 114 and the power supplying device 102, but not power signals. In such cases, the data and/or audio signals may be wirelessly received at the power supplying device 102 from the powered device 104 and then forwarded to the external device 114 via the cable 112, or the cable 112 may be used to send data and/or audio signals from the external device 114 to the power supplying device 102 for wireless transmission to the powered device 104.

As shown in FIG. 1, the powered device 104 may also be configured to wirelessly communicate with a remote device 116 included in the environment 101. The remote device 116 may be a conferencing device for handling data and/or audio signals received from the powered device 104. The received audio signals may include, for example, audio signals generated by the powered device 104 or audio signals received at the powered device 104 from the power supplying device 102. The received data signals may include, for example, control data input into the powered device 104 by the user, such as, e.g., a mute on or off selection, a power on or off section, a volume adjustment, call information for dialing an outgoing call, etc. In embodiments, the remote device 116 may include an audio processor for processing any received audio signals, an audio recorder configured to record any received audio signals for future playback, a data processor or controller for processing any receiving data signals, and/or a communications module for distributing the received audio and/or data signals to one or more other conferencing devices, via wired or wireless connections. As an example, in embodiments where the powered device 104 is a microphone, the received audio signals may represent human speech picked up in the environment 101 during a conference call. In such cases, the remote device 116 may be a networked device configured to transmit the received audio signals to one or more conference participants that are situated outside of the environment 101 (e.g., in another room, in another building, etc.), or to another wireless receiver disposed in the environment 101. In some cases, the remote device 116 may be substantially similar to the external device 114 described herein, except without the power delivery capability.

According to embodiments, a power coupling quality of the wireless system 100 may depend on a variety of factors, including an antenna size, or wireless transmission capacity, of the power supplying device 102, a power consumption need or capacity of the powered device 104, a degree of alignment or overlap between the powered device 104 on top of the surface 106 and the power supplying device 102 underneath the surface 106, a distance between the two devices 102 and 104, for example, due to a thickness of the surface 106, a type of material used to make the surface 106 (or the type of material being transmitted through), or any combination thereof. In some embodiments, the power supplying device 102 may have a range or boundary within which wireless power transfer can occur, and the powered device 104 may wirelessly receive power only when placed within that range. A size and shape of this wireless power transfer range may be determined by the size of the antenna and/or the type of wireless power transfer technology included in the power supplying device 102. In some cases, the powered device 104 may be only partially within the power transfer range but may still receive enough power to operate the device 104, due to the power consumption requirements of the powered device 104 and the total amount of power being transmitted by the power supplying device 102. In such cases, the amount of power received may be directly proportional to the amount or degree of overlap between the powered device 104 and the power supplying device 102.

To illustrate the above, FIGS. 2A and 2B, 3A and 3B, 4A and 4B, and 5A and 5B depict respective side and top views of four exemplary configurations for placing the powered device 104 and the power supplying device 102 on or under the surface 106 and show the variance in resulting power transfer levels. In embodiments, the received power level may be a relative power level (e.g., decibels (dB) or an absolute power level (dBm), while the power unit itself may be in watts. The side views in FIGS. 2A, 3A, 4A, and 5A may be substantially similar to the side view shown in FIG. 1, in terms of orientation.

In the depicted embodiments, a wireless power transfer range 120 of the power supplying device 102 substantially coincides with an upper surface area of the power supplying device 102, or the portion of the device 102 that is attached to the underside 108 of the surface 106, in terms of shape and size. In other embodiments, the wireless power transfer range 120 may be smaller or larger than the physical surface area of the power supplying device 102 and/or may have a different shape or configuration (e.g., oval, circular, square, etc.). The exact size, shape, or configuration of the wireless power transfer range 120 may depend on the type of wireless power transfer technology used by the power supplying device 102.

As will be appreciated, the power supplying device 102 may be configured so that the wireless power transfer range 120 extends upwards from the power supplying device 102, so as to reach from the bottom side 108, through the surface 106, and onto the top side 110, where it will be accessible to the powered device 104. In some cases, a thickness of the table 106 (e.g., the distance between the top side 110 and the underside 108) may be selected to ensure that a threshold amount of power is transmitted from the power supplying device 102 to the top side 110 of the surface 106. In some cases, in addition to table thickness, the material used to construct the table 106 may be selected to ensure maximum power transfer to the top side 110, or at least the threshold amount of power.

As also shown, in some embodiments, the powered device 104 may be smaller in size than the power supplying device 102 and/or the wireless power transfer range 120. For example, a bottom surface area of the powered device 104, or the portion of the device 104 that is attached to the top side 110 of the surface 106, may be smaller than the upper surface area of the power supplying device 102. This configuration may be preferred in order to provide flexibility in terms of placement of the powered device 104 relative to the power supplying device 102, to facilitate the alignment of the two devices 102 and 104, and/or to allow multiple powered devices to be placed within the wireless power transfer range 120. In some embodiments, a size of the bottom surface of the powered device 104 may be selected depending on the power consumption requirements of the device 104. For example, the powered device 104 may have a larger bottom surface size in order to overlap a larger portion of the wireless power transfer range 120, and thereby, receive more power from the power supplying device 102.

In other embodiments, the power supplying device 102 may be smaller in size than the powered device 104, so long as the power transfer capability is sufficient to power or operate the powered device 104. For example, in some cases, it may be preferable to have a smaller power supplying device 102 because the amount of available space on the bottom side 108 of the table 106 is limited and can only fit a smaller-sized power transmitter.

In some embodiments, the wireless system 100 may include a plurality of power supplying devices 102 coupled to the underside 108 of the table 106. The plurality of power supplying devices 102 may be spread out or arranged at various locations under the table 106, so that a larger portion of the top side 110 of the table 106 is capable of wirelessly transferring power to the powered device 104. This larger wireless power transfer range 120 provides more options for placement of the powered device 104 on the top side 110, thus enabling the powered device 104 to be moved to different locations around the table 106, as needed. The larger wireless power transfer range 120 also enables the wireless system 100 to further include a plurality of powered devices 104 that can be placed at various locations on the top side 110 of the table 106 and moved around as needed. In some cases, all or several of the power supplying devices 102 may be arranged side by side or adjacent to each other, in order to create one large, contiguous wireless power transfer range 120 on the top side 110. In other cases, each of the power supplying devices 102 may be located at a discrete location (e.g., each corner of the table 106, spaced apart along a center of the table, near each seat of the table 106, etc.), so as to provide separate wireless power transfer ranges 120 in multiple areas of the top side 110. In some embodiments, the plurality of powered devices 104 and the plurality of power supplying devices 102 may be networked together. For example, the devices 102 and 104 may form a wireless network, or may be communicatively coupled to the same wireless network.

FIGS. 2A and 2B depict an exemplary configuration for achieving 100% received power level at the powered device 104, or a maximum possible amount of power transfer given the distance from the power supplying device 102 and other surface properties (e.g., the type of material and thickness of surface 106), as well as other power transfer considerations in the environment 101 (e.g., power transmitter strength, receiver sensitivity, etc.). As shown, the powered device 104 is positioned entirely within the wireless power transfer range 120, thus enabling the powered device 104 to receive the maximum possible amount of power from the power supplying device 102, or at least all of the power it needs. As shown in FIG. 2B, the powered device 104 does not have to be centered in the wireless power transfer range 120 in order to achieve 100% power transfer, so long as there is complete overlap between the powered device 104 and the range 120. Conversely, FIGS. 5A and 5B depict an exemplary configuration in which the wireless system 100 has zero or no power transfer because the powered device 104 is completely misaligned with the power supplying device 102, or does not overlap the wireless power transfer range 120 at all.

As shown in FIGS. 3A and 3B, and FIGS. 4A and 4B, when the two devices 104 and 102 are partially aligned, the wireless system 100 may exhibit varying levels of power transfer depending on the amount or degree of alignment. For example, FIGS. 3A and 3B depict an exemplary configuration in which the powered device 104 is mostly aligned with the power supplying device 102, or a large majority of the powered device 104 overlaps with the wireless power transfer range 120, and therefore, receives a large majority (e.g., 90%) of the power being transferred from the power supplying device 102 to the top side 110 of the surface 106. In many cases, this level of power transfer may be sufficient to power the device 104. FIGS. 4A and 4B depict an exemplary configuration in which about half of the powered device 104 overlaps the wireless power transfer range 120 and therefore, the received power level is approximately 50%. In some cases, this level of power transfer may not be enough power to operate the powered device 104 due to the power consumption requirements of the device 104 (e.g., where the device 104 requires at least one 1 watt). In other cases, a received power level of 50% may be sufficient to power the powered device 104 due to a lower power consumption requirement (e.g., where the device 104 requires about 0.5 watt). In both examples, the exact correlation between physical overlap and power transfer amount may not be perfectly linear because the received power level also depends on various other factors, including surface material, a distance between the devices 102 and 104, and the wireless circuitry or power transfer method used, as described herein.

Thus, an important consideration during installation of the wireless system 100 is ensuring that a location of the powered device 104 on the top side 110 of the surface 106 is sufficiently adjacent to, or in alignment with, the power supplying device 102 attached to the underside 108 of the surface 106, for example. Often times, this may be difficult to assess because the power supplying device 102 may not be visible to an installer looking to place the powered device 104 on top of the surface 106.

Accordingly, in some embodiments, the powered device 104 comprises an alignment unit 122 configured to indicate, on a user-facing (or top) side of the powered device 104, whether a current position of the powered device 104 is sufficiently aligned with the power supplying device 102 to effectively enable wireless power transfer. In some cases, the alignment unit 122 may detect a physical alignment of the powered device 104 with the power supplying device 102, for example, using one or more position sensors, and display a visible indication of the detected alignment. In other cases, the alignment unit 122 may be configured to detect a power coupling effectiveness between the two devices 104 and 102, for example, using one or more power sensors, and determine an alignment status of the devices 104 and 102 based thereon. In embodiments, the alignment unit 122 may include a light indicator (e.g., LED) configured to illuminate or turn on once the unit 122 determines that the amount of power received from the power supplying device 102 is sufficient to power the powered device 104. As described herein, this may occur once the powered device 104 is sufficiently aligned with the power supplying device 102, or sufficiently overlaps its wireless power transfer range 120. Other techniques to determine alignment and/or indicate whether there is sufficient wireless power transfer are also contemplated. Further details about the alignment unit 122 are provided below with respect to FIGS. 6 and 7.

FIG. 6 depicts an exemplary wirelessly powered device 600 (also referred to herein as a "powered device"), in accordance with embodiments. The powered device 600 comprises a wireless module 602 configured to wirelessly receive power from a wireless power supplying device, one or more electrical component(s) 604 configured to consume the received power, an alignment module 606 configured to communicate whether the powered device 600 is sufficiently aligned with, or being sufficiently powered by, the power supplying device, and a controller 608 for controlling various functions of the powered device 600, including the alignment module 606. The powered device 600 may be included in the wireless power transfer system 100 of FIG. 1 as the powered device 104. In such cases, the powered device 600 may wirelessly, and contactlessly, receive power from the power supplying device 102, as shown in FIG. 1. In other cases, the powered device 600 may be configured to wirelessly receive power from the power supplying device while being in contact therewith.

The wireless module 602 comprises a wireless receiver 610 configured to wirelessly receive an electric power signal from the power supplying device. As shown in FIG. 6, the powered device 600 does not include a battery and a charge management device or other charging technology, as is conventional for most wireless power delivery systems, because the received power is not used for charging purposes. Rather, the received power signal is provided to the one or more electrical components 604 for direct consumption. The wireless receiver 610 may be configured to receive the electric power signal using wireless power delivery technology, such as, e.g., magnetic inductive coupling, capacitive coupling, electromagnetic radiation or other RF energy transfer protocol, etc. The exact technology used may correspond to the wireless power transfer technology found in the corresponding power supplying device. In some embodiments, the wireless receiver 610 may include a coil of wire that is configured to wirelessly receive power from a similar coil disposed in a wireless transmitter of the power supplying device, the power transfer being induced from coil to coil by a magnetic field, or through inductive coupling. In other embodiments, the wireless receiver 610 may include an electrode, or conductive metal plate, configured to wirelessly receive power from a similar electrode disposed in a wireless transmitter of the power supplying device, the power being transferred from electrode to electrode using an electric field, or through capacitive coupling. In still other embodiments, the wireless receiver 610 may be a radio frequency (RF) receiver configured to receive the electric power signal as a directed electromagnetic beam, or a radio frequency wave, transmitted by an RF transmitter of the power supplying device using a wireless RF energy transfer protocol.

According to embodiments, the wireless module 602 can be further configured to facilitate wireless communication with the power supplying device, in addition to wirelessly receiving power therefrom. For example, the wireless receiver 610 may be further configured to receive a data signal from the power supplying device. In some cases, the wireless receiver 610 may be a radio frequency receiver capable of receiving the electrical power signal and the data signal, either simultaneously or one at a time (i.e. staggered transmission). In other cases, the data signal may be modulated with the electric power signal and transmitted, in-band, to the wireless receiver 610 using the same wireless transfer technique.

The received data signal may include control information or commands for controlling or adjusting a parameter of the one or more electrical component(s) 604, such as, e.g., a mute on or off command, a power on or off command, gain settings, etc. In some cases, the wireless receiver 610 may also be configured to receive an audio signal from the power supplying device. The received audio signal may include streaming audio data or other audio data to be played by the powered device 600, for example, in embodiments where the powered device 600 includes a loudspeaker. In some cases, the wireless receiver 610 may be configured to receive audio and/or data signals from another electronic device associated with the conferencing environment (such as, e.g., remote device 116 shown in FIG. 1).

As shown in FIG. 6, in some embodiments, the wireless module 602 further comprises a wireless transmitter 612 configured to transmit one or more of audio signals and data signals to the power supplying device or to another electronic device, such as, e.g., remote device 116 shown in FIG. 1. In embodiments where the one or more electrical components 604 include a microphone, audio signals transmitted by the wireless transmitter 612 may include audio detected and captured by the powered device 600 and transmitted as a stream of audio data to the remote device 116, for example. In other cases, audio signals transmitted by the wireless transmitter 612 may include audio received at the powered device 600 from the power supplying device for transmission to the other electronic device. Data signals transmitted by the wireless transmitter 612 to the power supplying device or other electronic device may include user inputs or other control information received at the powered device 600, for example, in embodiments where the one or more electrical components 604 include a user input device or other user interface (e.g., mute button, dialer, control button, etc.).

In some embodiments, the wireless transmitter 612 and the wireless receiver 610 can be configured to communicate with the power supplying device or other electronic device using one or more wireless protocols, or over one or more wireless communication networks, such as, for example, WiFi, cellular, Bluetooth, Near Field Communication (NFC), Radio Frequency Identification (RFID), infrared, a proprietary protocol, etc. Though not shown, the wireless module 602 may also include one or more antennas, radios, and other hardware for connecting to, or interfacing with, the one or more wireless networks. In some cases, the wireless receiver 610 and the wireless transmitter 612 may be configured to use the same wireless protocol. In such cases, the receiver 610 and transmitter 612 may be integrated into a single unit, e.g., a transceiver. In other cases, the wireless receiver 610 and the wireless transmitter 612 may be configured to use different types of wireless communication technology, or different wireless protocols. For example, the wireless receiver 610 may be configured to use a first wireless protocol (such as, e.g., Bluetooth or other short-range communication network) to receive power and/or data signals from the power supplying device, and the wireless transmitter 612 may be configured to use a second wireless protocol (such as, e.g., WiFi or other long range communication network) to transmit audio and/or data signals to the other electronic device (e.g., remote device 116).

In other embodiments, the wireless transmitter 612 may be configured for radio frequency communication using, for example, Bluetooth, WiFi, a proprietary wireless protocol, or other wireless network protocol, and the wireless receiver 610 may be configured for wireless power transfer using inductive coupling, capacitive coupling, or RF energy transfer techniques, for example. In such cases, the received data and/or audio signals may be transported to the wireless module 602 using either in-band communication (e.g., data signals that are embedded directly into the wireless power transfer protocol using modulation techniques) or out-of-band communication (e.g., data signals transmitted to the wireless module 602 using a separate wireless protocol). In the latter case, the wireless module 602 may include a second wireless receiver (not shown) configured to use wireless communication protocols to receive data and/or audio. In some cases, the second wireless receiver and the wireless transmitter 612 are configured to use the same wireless communication protocol and thus, are integrated into a single transceiver for both transmitting and receiving data.

In some embodiments, the power supplying device may be configured to transport power, audio, and/or data signals to the powered device 600 using in-band communications (e.g., within the same radio frequency band or channel). For example, the power supplying device may transmit, to the powered device 600, a modulated wireless signal comprising both the electric power signal and the data signal within the same band or channel. In such cases, the wireless module 602 may include a demodulator/modulator 614 to separate the wireless signal into its constituent parts. In some cases, the power supplying device may also be configured to receive data and/or audio signals from the powered device 600 using the in-band communication link.

In other embodiments, the power supplying device may be configured to transport power, audio, and/or data signals to the powered device 600 using out-of-band communications (e.g., using different frequency bands or different wireless protocols). For example, the power supplying device may use a first radio frequency channel (or frequency band) to send the electrical power signal and a second radio frequency channel to send the data signal to the powered device 600, wherein the first frequency band does not overlap the second frequency band. In such cases, the wireless receiver 610 may be configured to receive both signal types. In other cases, the power supplying device may use a first wireless protocol (such as, e.g., Qi, Power Matters Alliance (PMA), a proprietary protocol, etc.) to send the electrical power signal and a second wireless protocol (such as, e.g., Bluetooth, WiFi, NFC, a proprietary protocol, etc.) to send the data signal to the powered device 600. In such cases, the wireless receiver 610 may be configured to receive the electric power signal, and the wireless module 602 may comprise a second wireless receiver configured to receive the data signal.

The wireless module 602 may be configured to use either in-band communications or out-of-band communications depending on the type of powered device 600 and the type of data being transported. For example, in-band communications may be preferred in embodiments where the powered device 600 requires low power levels and/or small data rates, such as, e.g., a mute button or other user input device. On the other hand, out-of-band communications may be preferred in embodiments where the powered device 600 requires higher power levels and/or higher data rates, such as, e.g., a microphone or other device involving streaming audio and/or visual data.

As shown in FIG. 6, the wireless module 602 further comprises at least one of a demodulator, a modulator, or a modem, collectively referred to herein as demodulator/modulator 614. The demodulator/modulator 614 can be configured to demodulate an incoming radio frequency (RF) signal or modulate an outgoing RF signal, as needed. For example, the wireless receiver 610 may receive a modulated wireless signal from the power supplying device comprising both the electric power signal and an in-band data signal. In such cases, the demodulator/modulator 614 may be configured to de-modulate the wireless signal and extract the data signal from the wireless power signal. The demodulation technique applied by the demodulator/modulator 614 may depend on the modulation technique (e.g., amplitude modulation, phase modulation, or load modulation) used by the power supplying device to generate the modulated wireless signal, as described with respect to FIG. 8. As another example, the demodulator/modulator 614 may be configured to modulate an outgoing signal comprising audio and data, prior to transmission by the wireless transmitter 612 to the power supplying device or other electronic device.

The one or more electrical components 604 can be configured to consume the power received via the wireless module 602, thus constituting an electrical load of the powered device 600. In embodiments, the exact type of electrical device or hardware included in the one or more electrical components 604 may vary depending on the type of powered device 600. For example, in embodiments where the powered device 600 is a microphone configured to detect and capture sounds in an environment (e.g., environment 101 of FIG. 1), the one or more electrical components 604 may include one or more microphone transducers (e.g., condenser, MEMS, dynamic, electret, electrostatic, etc.). As another example, in embodiments where the powered device 600 is a loudspeaker or speaker system configured to produce an audio output for the environment, the one or more electrical components 604 may include one or more audio transducers or drivers (e.g., dynamic, electrostatic, etc.). In other embodiments, the powered device 600 may be a user interface for controlling one or more features of the environment, such as, e.g., turning a mute function on or off for a remotely-situated microphone, turning power on or off for an overall room system, dialing an outgoing call via a networked device or telephone, controlling a volume level of a remotely-situated speaker, etc. In such cases, the one or more electrical components 604 may include one or more user input devices (such as, e.g., a touch screen, button(s), slider(s), knob(s), etc.), display devices, or any combination thereof) and an electrical circuit or controller for implementing said feature(s). In some embodiments, the one or more electrical components 604 may also include one or more other types of hardware, such as, e.g., discrete logic circuits, application specific integrated circuits (ASIC), programmable gate arrays (PGA), field programmable gate arrays (FPGA), digital signal processors (DSP), microprocessor, etc.

The alignment module 606 is configured to communicate a power coupling effectiveness between the powered device 600 and the power supplying device, in order to help align the powered device 600 with the power supplying device during installation. In some embodiments, the alignment module 606 may be substantially similar to the alignment unit 122 shown in FIG. 1 and described herein. As shown in FIG. 6, the alignment module 606 comprises a power sensor 616 configured to detect or measure a power level of the electric power signal received at the wireless receiver 610 from the power supplying device. The received power level may be a relative power level (e.g., decibels (dB) or an absolute power level (dBm). In some embodiments, the power sensor 616 may be configured to convert a high frequency power signal, received from the power supplying unit via the wireless receiver 610, to a DC or low frequency power signal, and provide this signal to a power meter also included in the alignment module 606. In such cases, the power meter may be configured to measure the DC signal and determine a radio frequency (RF) power level based thereon. The power meter may then output a power value in watts (W) or decibels (dB) for the receiving power signal. As an example, the power sensor 606 may be a thermistor, thermocouple, diode detector, analog to digital converter system, or any other appropriate electronic device for measuring or correlating power In other embodiments, the alignment module 606 may include a thermal sensor, diode sensor, position sensor, or other sensing technology capable of measuring or correlating a power level of the received electric power signal.

The alignment module 606 further comprises an indicator 618 configured to indicate or communicate whether the detected power level is enough power to operate the powered device 104. For example, the indicator 618 may be a light indicator (e.g., light emitting diode (LED)) configured to illuminate when the received power level is sufficient, a haptic transducer configured to vibrate when the received power level is sufficient, or any other electronic device capable of providing an indication. In other embodiments, the indicator 618 may be a display screen (e.g., LCD), a haptic transducer, or any other type of user interface.

In embodiments, the controller 608 may be configured to control one or more aspects of the powered device 600, such as, for example, operation of the alignment module 606 and/or operation of the wireless module 602. In some embodiments, the controller 608 may be an integrated circuit (e.g., a system on chip (SOC) or the like) that has the components of the alignment module 606 embedded into the same circuit. In other embodiments, the controller 608 may be coupled to the alignment module 606 and may include any suitable hardware (e.g., microprocessor, dedicated integrated circuit, field programmable gate array (FPGA), Application Specific Integrated Circuit (ASIC), etc.). The controller 608 can include a memory (not shown) configured to store software that includes one or more separate programs comprising ordered listings of executable instructions for implementing logical functions, and a data processor (not shown) configured to execute software, particularly software stored in the memory of the controller 608.

Thus, various embodiments provide a wirelessly powered device, comprising a wireless receiver configured to receive an electric power from a wireless power supplying device; at least one electrical component configured to consume the received electric power; and an alignment module configured to activate an indicator upon determining that a measured level of the received power is greater than a threshold level. In some embodiments, the measured level of received power exceeds the threshold level when the wirelessly powered device substantially overlaps the wireless power supplying device. In some embodiments, the wirelessly powered device further comprises a power sensor configured to determine the measured level of received power. In some embodiments, the indicator comprises one or more lighting devices configured to illuminate when activated, thereby providing a visible indication to a user.

Figure 7:
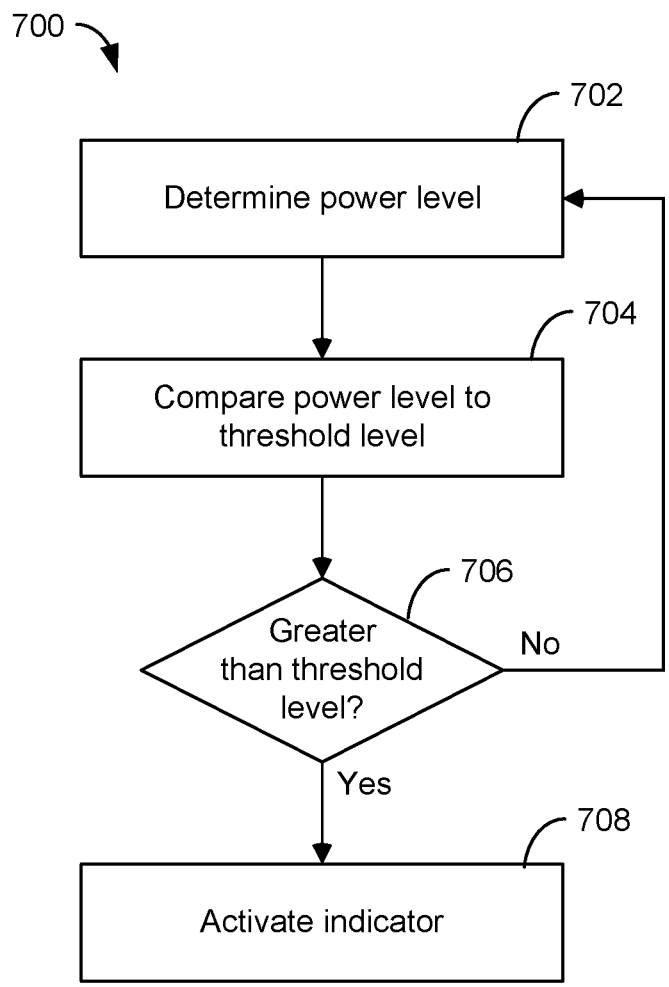
FIG. 7 is a flowchart depicting an exemplary method for activating an alignment indicator while using the wireless power transfer system of FIG. 1, in accordance with certain embodiments.

Referring additionally to FIG. 7, shown is an exemplary method 700 of activating an alignment indicator while using a wireless power transfer system, in accordance with embodiments. The method 700 may be implementing by a data processor executing software stored in a memory and accessible by the processor. In some embodiments, the method 700 may be carried out by a wirelessly powered device, such as, e.g., the powered device 600 or the powered device 104 of FIG. 1. More specifically, in the case of the former, the method 700 may be carried out by the data processor of the controller 608 and may be used to control the power sensor 616 and indicator 618 of the alignment module 606. In other embodiments, the method 700 may be carried out by a wireless power supplying device, such as, e.g., power supplying device 800 shown in FIG. 8 or the power supplying device 102 of FIG. 1. In the former case, the method 700 may be carried out by a controller 808 of the power supplying device 800 (or a data processor included therein) and may be used to control a power sensor 816 and indicator 818 of an alignment module 806 included in the power supplying device 800.

The method 700 can begin at step 702 with determining or measuring a power level of a wireless electric power signal, using a power sensor and a processor. The power level may be a relative power level (e.g., decibels (dB) or an absolute power level (dBm). In some embodiments, the electric power signal may be wirelessly received at the powered device. In other embodiments, the electric power signal may be wirelessly transmitted by the power supplying device. In one embodiment, step 702 may be carried out by the processor of the controller 608 causing the power sensor 616 to measure the power level of the received power signal and send the measured power level to the controller 608 for further processing, for example.

In some embodiments, the powered device, or power supplying device, may require a minimum (or small) amount of power in order to make the determination at step 702 or otherwise carry out the method 700. In such cases, the corresponding device may include a low power circuit configured to carry out the method 700, or otherwise show alignment and power transfer status, once the minimum amount of power is wirelessly received. To achieve this, the low power circuit may begin receiving power first, before the rest of the device. As a result, the method 700 may not begin until the powered device, or power supplying device, starts to receive enough power to operate the low power circuit. In some embodiments, the low power circuit may be included in the powered device 600 as one of the electrical components 604, as part of the alignment module 606, controller 608, and/or wireless module 602, or as a stand-alone component coupled to the alignment module 606 and/or the wireless module 602, either directly or via the controller 608. In other cases, the low power circuit may be powered by a small battery, an external pre-charge system, or other limited power source included in the powered device (or power supplying device), so that, for at least some amount of time, the alignment determination and status indication (i.e. method 700) can occur even before any power is wirelessly received (i.e. a zero received power level) at the device.

In some cases, the powered device 600 may not operate at its full operational capacity until after a positive determination is made at step 706 (i.e. the measured power level exceeds a predetermined threshold power level), or after the method 700 is complete (i.e. after step 708). For example, the powered device, or power supplying device, may be in a "hunting" phase, or operate in a low power capacity, while the method 700 is being carried out by the low power circuit. Once the alignment indicator is activated at step 708, or a determination is made that the received power level is sufficient to power the entire device, the powered device, or power supplying device, may exit the hunting phase and boot completely, thus entering the full operational capacity.

In some embodiments, the method 700 further includes an intermediate step, between steps 702 and 704, where the measured power level, or the result of step 702, is displayed as a percentage or fraction of the maximum power level, using the indicator or alignment module of the device. In such cases, the indicator may be activated to display the measured power level while the processor is still operating in the hunting mode (i.e. prior to turning the entire device on). The indicator may be used to display the measured power information using any suitable technique, including, for example, activating only a corresponding portion of the indicator (e.g., lighting up two bars out of four if the measured power level is only 50%), changing a color or other characteristic of the indicator (e.g., changing an LED light color from red to orange to green as the received power level moves closer and closer to maximum), or displaying the actual percentage or number on a display screen of the indicator. For the latter example, the display screen may be included in the alignment module 606 of the powered device 600, for example, as part of the indicator 618, or in the alignment module 806 of the power supplying device 800, for example, as part of the indicator 618.

The displayed percentage amount, or other received power level, may be relative to the power requirements of the device. For example, a smaller device, or other device with lower power requirements, may not need 100% overlap, or perfect alignment, in order to be fully operational because the smaller device requires less power in order to operate. Hence, such smaller device may display a 100% power level even though the powered device and the power supplying device are not perfectly aligned and thus, the actual power level is not at 100% either. As another example, the smaller device may display a 50% power level even though the measured power level relatively small.

Referring back to FIG. 7, at step 704, a processor is used to compare the measured power level to a threshold power level. The threshold power level may be a minimum amount of power required to fully operate the powered device 600, or exit the hunting mode, and may vary depending on the type of powered device 600, or more specifically, a power consumption requirement of the powered device 600. In some embodiments, the threshold power level is stored in a memory, such as, the memory of the controller 608, and step 704 includes causing the processor of the controller 608 to retrieve the threshold power level from the memory and compare the received level to the threshold level. In some embodiments, the controller 608 determines the threshold power level based on a power consumption requirement of the powered device 600 and stores the determined level in the memory.

Step 706 includes determining whether the received power level is greater than or equal to the threshold power level. In some embodiments, step 706 may be carried out by the processor of the controller 608. If the received power level is less than the threshold level, i.e. the answer at step 706 is "no," the method 700 may return to step 702, where the method 700 starts again with assessing a newly received power signal. If the received power level is greater than or equal to the threshold level, i.e. the answer at step 706 is "yes," the method 700 proceeds to step 708.

At step 708, an indicator is activated to communicate that the received power level is sufficient to operate the powered device. In some embodiments, step 708 may be carried out by the controller 608 causing the indicator 618 to illuminate or turn on in response to making a positive determination at step 706. Conversely, when the indicator is not turned on or activated, i.e. the method 700 does not reach step 708, this also communicates a message to the installer—that the powered device is not properly aligned with the power supplying device. In response to seeing no indication, the installer may continue to shift the powered device to new locations until the indicator turns on, or otherwise hunt for proper alignment. In this manner, the method 700 may be used to display an effectiveness of the power coupling between a wirelessly powered device and a wireless power supplying device.

Thus, various embodiments provide a method of indicating a received power level in a wireless power transfer system, the system having a processor communicatively coupled to a power sensor and an indicator, and the method comprising determining, using the power sensor, a power level of the wireless electric power signal; comparing, using the processor, the determined power level to a threshold level; and upon determining that the power level exceeds the threshold level, activating the indicator. In some embodiments, the method may further comprise receiving the wireless electric power signal at the processor and/or presenting the determined power level relative to a maximum power level, using the indicator.

FIG. 8 depicts an exemplary wireless power supplying device 800 (also referred to herein as a "power supplying device"), in accordance with embodiments. The power supplying device 800 comprises a wireless module 802 configured to wirelessly transmit power to a wirelessly powered device, such as, e.g., the powered device 600 shown in FIG. 6. The power supplying device 800 further comprises a power supply unit 804 configured to provide an electric power signal to the wireless module 802 for transmitting to the powered device. The power supplying device 800 can also comprise a controller 808 for controlling various functions of the power supplying device 800. In embodiments, the power supplying device 800 may be included in the wireless power transfer system 100 of FIG. 1 as the power supplying device 102. In such cases, the power supplying device 800 may wirelessly, and contactlessly, transmit power to the powered device 104, as shown in FIG. 1. In other cases, the power supplying device 800 may be configured to wirelessly transmit power to the powered device while being in contact therewith.

The wireless module 802 comprises a wireless transmitter 812 configured to wirelessly transmit an electric power signal from the power supply unit 804 to the powered device. The wireless transmitter 812 may be configured to transmit the electric power signal using wireless power delivery technology, such as, e.g., magnetic inductive coupling, capacitive coupling, electromagnetic radiation or other RF energy transfer protocol, etc. In some embodiments, the wireless transmitter 812 may include a coil of wire that is configured to wirelessly transmit power to a similar coil disposed in a wireless receiver of the powered device, the power transfer being induced from coil to coil by a magnetic field, or through inductive coupling. In other embodiments, the wireless transmitter 812 may include an electrode, or conductive metal plate, configured to wirelessly transmit power to a similar electrode disposed in a wireless receiver of the powered device, the power being transferred from electrode to electrode using an electric field, or through capacitive coupling. In still other embodiments, the wireless transmitter 812 may be a radio frequency (RF) transmitter configured to transmit or send the electric power signal as a directed electromagnetic beam or radio frequency wave, using a wireless RF energy transfer protocol, to an RF receiver of the powered device. In some embodiments, the wireless transmitter 812 can be configured to transmit one or more steerable power beams towards one or more targeted locations. For example, the wireless transmitter 812 may include hardware, software, or a combination thereof, configured to dynamically steer the power beam towards a powered device as it moves about the room.

According to embodiments, the wireless module 802 can be further configured to facilitate wireless communication with the powered device, in addition to wirelessly transmitting power thereto. For example, the wireless transmitter 812 may be further configured to transmit a data signal to the powered device. In some cases, the wireless transmitter 812 may be a radio frequency transmitter capable of transmitting the electrical power signal and the data signal, either simultaneously or one at a time (i.e. staggered transmission). In other cases, the data signal may be modulated with the electric power signal and transmitted, in-band, by the wireless transmitter 812 using the same wireless transfer technique.

The transmitted data signal may include control information or commands for controlling or adjusting a parameter or setting of the powered device, such as, e.g., a mute on or off command, a power on or off command, gain settings, etc. In some cases, the wireless transmitter 812 may also be configured to transmit an audio signal to the powered device. The transmitted audio signal may include streaming audio data or other audio data to be played by the powered device, for example, in embodiments where the powered device includes a loudspeaker. In some cases, the wireless transmitter 812 may be configured to transmit, to the powered device, audio and/or data signals received from another electronic device associated with the conferencing environment (such as, e.g., external device 114 shown in FIG. 1).

As shown in FIG. 8, in some embodiments, the wireless module 802 further comprises a wireless receiver 810 configured to receive one or more of audio signals and data signals from the powered device (e.g., via wireless transmitter 612 of powered device 600) or from another electronic device, such as, e.g., remote device 116 shown in FIG. 1. In some cases, the power supplying device 800 may be further configured to provide the received signals to an external device (such as, e.g., external device 114 of FIG. 1) via a cable coupling the power supplying device 800 to the external device (e.g., cable 112 of FIG. 1). In embodiments where the powered device is a microphone, for example, audio signals received at the wireless receiver 810 may include audio detected and captured by the powered device and transmitted to the power supplying device 800 as a stream of audio data. Data signals received at the wireless receiver 810 from the powered device may include user inputs or other control information received at the powered device, for example, in embodiments where the powered device includes a user input device or other user interface (e.g., mute button, dialer, control button, etc.).

In some embodiments, the wireless transmitter 812 and the wireless receiver 810 can be configured to communicate with the powered device or other electronic device using one or more wireless protocols, or over one or more wireless communication networks, such as, for example, WiFi, cellular, Bluetooth, Near Field Communication (NFC), Radio Frequency Identification (RFID), infrared, a proprietary protocol, etc. Though not shown, the wireless module 802 may also include one or more antennas, radios, and other hardware for connecting to, or interfacing with, the one or more wireless networks. In some cases, the wireless transmitter 812 and the wireless receiver 810 may be configured to use the same wireless communication technology, or wireless protocol. In such cases, the transmitter 812 and receiver 810 and may be integrated into a single unit, e.g., a transceiver. In other cases the wireless transmitter 812 and the wireless receiver 810 may be configured to use different wireless protocols. For example, the wireless transmitter 812 may be configured to use a first wireless protocol (such as, e.g., Bluetooth or other short-range communication network) to transmit power and data signals to the powered device, and the wireless receiver 810 may be configured to use a second wireless protocol (such as, e.g., WiFi or other long range communication network) to receive audio and/or data signals from another electronic device.

In other embodiments, the wireless receiver 810 may be configured for radio frequency communication using, for example, Bluetooth, WiFi, a proprietary wireless protocol, or other wireless network protocol, and the wireless transmitter 812 may be configured for wireless power transfer using inductive or capacitive coupling, for example. In such cases, the data and/or audio signals may be transmitted by the wireless module 802 using either in-band communication (e.g., data signals that are embedded directly into the wireless power transfer protocol using modulation techniques) or out-of-band communication (e.g., data signals transmitted by the wireless module 802 using a separate wireless protocol). In the latter case, the wireless module 802 may include a second wireless transmitter (not shown) configured to use wireless communication protocols to transmit data and/or audio. In some cases, the second wireless transmitter and the wireless transmitter 812 are configured to use the same wireless communication protocol and thus, are integrated into a single transceiver for both transmitting and receiving data.

In some embodiments, the power supplying device 800 may be configured to transport power, audio, and/or data signals to the powered device using in-band communications (i.e. within the same radio frequency band or channel). For example, the power supplying device 800 may transmit, to the powered device, a modulated wireless signal comprising both the electric power signal and the data signal within the same band or channel. In such cases, the wireless module 802 may include a modulator/demodulator 814 for combining the two signals into one wireless signal. In some cases, the power supplying device 800 may also be configured to receive data and/or audio signals from the powered device using the in-band communication link.

In other embodiments, the power supplying device 800 may be configured to transport power, audio, and/or data signals to the powered device using out-of-band communications (i.e. using different frequency bands or different wireless protocols). For example, the power supplying device 800 may use a first radio frequency channel (or frequency band) to send the electrical power signal and a second radio frequency channel to send the data signal to the powered device, wherein the first frequency band does not overlap the second frequency band. In such cases, the wireless transmitter 812 may be configured to transmit both signal types. In other cases, the power supplying device 800 may use a first wireless protocol (such as, e.g., Qi, PMA, a proprietary protocol, etc.) to send the electrical power signal and a second wireless protocol (such as, e.g., Bluetooth, WiFi, NFC, a proprietary protocol, etc.) to send the data signal to the powered device. In such cases, the wireless transmitter 812 may be configured to transmit the electric power signal, and the wireless module 802 may comprise a second wireless transmitter configured to transmit the data signal.

The wireless module 802 may be configured to use either in-band communications or out-of-band communications depending on the type of powered device receiving power from the power supplying device 800 and the type of data being transported between the two devices. For example, in-band communications may be preferred in embodiments where the powered device requires low power levels and/or small data rates, such as, e.g., a mute button or other user input device. On the other hand, out-of-band communications may be preferred in embodiments where the powered device requires higher power levels and/or higher data rates, such as, e.g., a microphone or other device involving streaming audio and/or visual data.

As shown in FIG. 8, the wireless module 802 further comprises at least one of a modulator, a demodulator, or a modem, collectively referred to herein as modulator/demodulator 814. The modulator/demodulator 814 can be configured to modulate an outgoing radio frequency (RF) signal or demodulate an incoming RF signal, as needed. For example, the wireless transmitter 812 may transmit a modulated wireless signal to the powered device comprising both the electric power signal and an in-band data signal. In such cases, the modulator/demodulator 814 may be configured to modulate the electric power signal with the data signal. The modulation technique applied by the modulator/demodulator 814 may be amplitude modulation, phase modulation, load modulation, frequency modulation, or any other appropriate technique. The exact modulation technique used may depend on a number of factors, including, for example, a required data rate for the type of data being transmitted, a bandwidth of the data signal, and the amount of power required to operate the powered device. As another example, the modulator/demodulator 814 may be configured to demodulate an incoming signal comprising audio and data that is received from the powered device or other electronic device.

The power supply unit 804 can be configured to supply an electric power signal to the wireless module 802 for transmission to the powered device. In some embodiments, the power supply unit 804 may include an integrated power source (e.g., battery) for supplying the electric power. In other embodiments, the power supply unit 804 may include an input port configured to receive power from an external power source coupled to the power supplying device 800 via a cable (e.g., cable 112 coupled to external device 114, as shown in FIG. 1). The external power source may be, for example, an electrical outlet (e.g., AC power socket) coupled to a wall or floor of the room, an external battery, an electric power generator, or any other device capable of supplying electric power. In some embodiments, the electric power signal provided to the wireless module 802 by the power supply unit 804 may be a DC output signal. In such cases, the power supply unit 804 may include a power conversion unit for converting an input AC power to the DC output signal. In some cases, the power supply unit 804 may include a backup battery, a low power supply unit, or other circuitry components, for example, in case the power source coupled to, or included in, the power supply unit 804 needs re-charging or is otherwise depleted.

In some embodiments, the power supplying device 800 further includes an alignment module 806 configured to communicate a power coupling effectiveness between the powered device and the power supplying device 800, in order to help align the power supplying device 800 with the powered device during installation. The alignment module 806 may be used, for example, in cases where the installer first installs the powered device at a desired location on a first side of a surface (e.g., on top of the table 106) and then installs the power supplying device 800 at an appropriately adjacent location on the other side of the surface (e.g., underneath the table 106). The alignment module 806 may be substantially similar to the alignment module 606 shown in FIG. 6 and therefore, will not be described in detail for the sake of brevity.

As shown in FIG. 8, the alignment module 806 comprises a power sensor 816 configured to detect or measure a power level of the electric power signal transmitted by the wireless transmitter 812 to the powered device. The power sensor 816 may be similar in operation to the power sensor 616 of FIG. 6 and may also interact with a power meter included in the alignment module 806 to measure the transmitted power level. In other embodiments, the alignment module 806 may include a thermal sensor, diode sensor, position sensor, analog to digital converter system, or other sensing technology capable of measuring or correlating a power level of the transmitted electric power signal.

The alignment module 806 further comprises an indicator 818 configured to indicate or communicate whether the detected power level is enough power to operate the powered device configured to receive wireless power from the power supplying device 800. For example, the indicator 818 may be a light indicator (e.g., light emitting diode (LED)) configured to illuminate when the received power level is sufficient, a haptic transducer configured to vibrate when the received power level is sufficient, or any other electronic device capable of providing an indication. In other embodiments, the indicator 818 may be a display screen (e.g., LCD), a haptic transducer, or any other type of user interface.

In embodiments, the controller 808 may be configured to control one or more aspects of the power supplying device 800, such as, for example, operation of the power supply unit 804, operation of the wireless module 802, and/or operation of the alignment module 806. In some embodiments, the method 700 may be carried out by the controller 808 and/or alignment module 806 to help the installer identify a position of the power supplying device 800 that is aligned with the position of the powered device, e.g., during the hunting mode. The controller 808 may be any suitable hardware (e.g., microprocessor, dedicated integrated circuit, field programmable gate array (FPGA), Application Specific Integrated Circuit (ASIC), etc.). The controller 808 can include a memory (not shown) configured to store software that includes one or more separate programs comprising ordered listings of executable instructions for implementing logical functions, and a data processor (not shown) configured to execute software, particularly software stored in the memory of the controller 808.

Thus, various embodiments provide a wireless power supplying device comprising a power supply; a wireless transmitter configured to transmit a data signal and electric power from the power supply to a wirelessly powered device; and a housing configured for attachment to a first side of a substantially planar surface, the wirelessly powered device being coupled to an opposite side of the surface.

Any process descriptions or blocks in the figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A wireless power transfer system for coupling to an external surface, the wireless power transfer system comprising:
   a first device comprising a power supply and configured to wirelessly transmit electric power from the power supply, the first device further comprising a first alignment module configured to activate a first indicator based on determining that a measured level of the transmitted electric power is greater than a threshold level; and
   a second device comprising one or more electrical components, the second device configured to wirelessly receive the electric power transmitted by the first device and provide the received electric power to the one or more electrical components for consumption, the second device further comprising a second alignment module configured to activate a second indicator based on determining that a measured level of the received electric power is greater than the threshold level,
   wherein the second device is further configured for placement on a user-facing side of the external surface such that the second indicator is visible on the user-facing side, and the first device is further configured for attachment to an opposite side of the external surface such that the first indicator is visible on the opposite side.

2. The wireless power transfer system of claim 1, wherein the first indicator is configured to provide a first indication when the measured power level exceeds a first threshold, and provide a second indication when the measured power level exceeds a second threshold that is higher than the first threshold, the second indication being different from the first indication.

3. The wireless power transfer system of claim 2, wherein the second threshold is a power level sufficient to operate the second device.

4. The wireless power transfer system of claim 2, wherein the first indication indicates a gross alignment of the first device with the second device, and the second indication indicates a fine alignment of the two devices that is sufficient to power operation of the second device.

5. The wireless power transfer system of claim 1, wherein the external surface is a tabletop, a countertop, a wall surface, or other substantially planar surface.

6. The wireless power transfer system of claim 1, wherein the measured level of received electric power exceeds the threshold level when the second device substantially overlaps the first device.

7. The wireless power transfer system of claim 1, wherein the first device comprises a first power sensor configured to determine the measured level of transmitted electric power, and the second device further comprises a second power sensor configured to determine the measured level of received electric power.

8. The wireless power transfer system of claim 1, wherein the second device is configured to wirelessly transmit a data signal to the first device indicating the measured level of received electric power.

9. The wireless power transfer system of claim 1, wherein the first device further comprises a wireless transmitter configured for short-range transmission of the electric power to the second device.

10. The wireless power transfer system of claim 1, wherein at least one of the first indicator or the second indicator comprises one or more lighting devices configured to illuminate when activated, so as to provide a visible indication of the measured power level to a user of the second device.

11. A wirelessly powered device, comprising:
    a wireless receiver configured to wirelessly receive an electric power and a data signal from a wireless power supplying device;
    at least one electrical component configured to consume the received electric power and adjust at least one setting of the at least one electrical component based on control data included in the data signal;
    a wireless transmitter configured to transmit a wireless signal generated by the at least one electrical component; and
    an alignment module configured to activate an indicator based on determining that a measured level of the received electric power is greater than a threshold level.

12. The wirelessly powered device of claim 11, wherein the indicator is configured to provide a first indication when the measured level of received electric power exceeds a first threshold, and provide a second indication when the measured level exceeds a second threshold that is higher than the first threshold, the second indication being different from the first indication.

13. The wirelessly powered device of claim 12, wherein the second threshold is a power level sufficient to operate the at least one electrical component.

14. The wirelessly powered device of claim 12, wherein the first indication indicates a gross alignment with the wireless power supplying device, and the second indication indicates a fine alignment with the wireless power supplying device that is sufficient to power operation of the at least one electrical component.

15. The wirelessly powered device of claim 11, wherein the measured level of received electric power exceeds the threshold level when the wirelessly powered device substantially overlaps the wireless power supplying device.

16. The wirelessly powered device of claim 11, further comprising a power sensor configured to determine the measured level of received electric power.

17. The wirelessly powered device of claim 11, wherein the wireless transmitter is further configured to transmit a data signal to the wireless power supplying device indicating the measured level of received electric power.

18. The wirelessly powered device of claim 11, wherein the indicator comprises one or more lighting devices configured to illuminate when activated, thereby providing a visible indication to a user.

19. The wirelessly powered device of claim 11, wherein the wireless transmitter is configured to transmit the wireless signal using a first wireless protocol, and the wireless receiver is configured to operate according to a second wireless protocol different from the first wireless protocol.

20. The wirelessly powered device of claim 11, wherein the at least one electrical component comprises one or more microphone elements configured to capture audio data, and the wireless signal includes the audio data captured by the one or more microphone elements.

* * * * *